United States Patent
Conover et al.

(10) Patent No.: US 11,627,462 B2
(45) Date of Patent: Apr. 11, 2023

(54) PROVIDING NETWORK ACCESS VIA COMMUNAL DEVICE

(71) Applicant: GOOGLE LLC, Mountain View, CA (US)

(72) Inventors: Christopher Conover, Mountain View, CA (US); Matthew Knapp, Mountain View, CA (US)

(73) Assignee: Google LLC, Mountain View, CA (US)

(*) Notice: Subject to any disclaimer, the term of this patent is extended or adjusted under 35 U.S.C. 154(b) by 103 days.

(21) Appl. No.: 17/070,640

(22) Filed: Oct. 14, 2020

(65) Prior Publication Data

US 2021/0136575 A1 May 6, 2021

Related U.S. Application Data

(60) Provisional application No. 62/914,903, filed on Oct. 14, 2019.

(51) Int. Cl.
*H04W 12/06* (2021.01)
*H04W 48/08* (2009.01)
*G06K 7/14* (2006.01)

(52) U.S. Cl.
CPC .......... *H04W 12/06* (2013.01); *G06K 7/1413* (2013.01); *G06K 7/1417* (2013.01); *H04W 48/08* (2013.01)

(58) Field of Classification Search
CPC ..... H04W 12/06; H04W 48/08; H04W 12/37; H04W 12/77; H04W 84/12; G06K 7/1413; G06K 7/1417
See application file for complete search history.

(56) References Cited

U.S. PATENT DOCUMENTS

| | | | | |
|---|---|---|---|---|
| 9,471,698 | B1* | 10/2016 | Liu | G06F 16/9554 |
| 10,833,947 | B2* | 11/2020 | Helvey | H04L 43/0894 |
| 2011/0307610 | A1* | 12/2011 | Hayashi | H04W 12/06 709/225 |
| 2015/0288670 | A1* | 10/2015 | Bhooshan | H04L 12/6418 726/5 |
| 2018/0309651 | A1* | 10/2018 | Kim | G06F 21/552 |
| 2019/0124049 | A1* | 4/2019 | Bradley | H04L 63/0428 |
| 2020/0204999 | A1* | 6/2020 | Daniel | H04L 9/3247 |

* cited by examiner

*Primary Examiner* — Kristine L Kincaid
*Assistant Examiner* — Lydia L Noel
(74) *Attorney, Agent, or Firm* — Kilpatrick Townsend & Stockton LLP

(57) ABSTRACT

Methods, systems, and devices are provided that allow for access to a wireless computer network, such as a home or business network, via a communal device. The communal device retrieves network access information such as a PSK and provides a machine-readable code such as a QR code or bar code that automatically provides the access information to a user's device, thereby allowing access to the network with little or no user input required.

11 Claims, 5 Drawing Sheets

PROVIDING NETWORK ACCESS VIA COMMUNAL DEVICE

CROSS-REFERENCE TO RELATED APPLICATIONS

This application claims priority to U.S. Provisional Application Ser. No. 62/914,903, filed Oct. 14, 2019, which is hereby incorporated by reference in its entirety for all purposes.

BACKGROUND

It is often desirable to provide access to a "guest" or similar computer network, such as a wireless network in a residence, business, or the like. The guest network may, for example, provide limited functionality or access such as reduced Internet access or speed; prevent non-authorized users from accessing a local private network such as a personal residence or secure business network; and/or limit the functionality available to devices connected to the guest network. In some cases, it also may be desirable to provide access to one or more computer networks available in an area regardless of functionality. It typically is considered good practice to require a passcode or equivalent event for conventional wireless "guest" networks to prevent unauthorized use by devices outside the physical area but possibly still within range of the wireless network. For example, a malicious or unauthorized device outside a home may be able to locate and access the home's wireless network if it is left "open" and unsecured with a passcode.

SUMMARY

Figure 1:
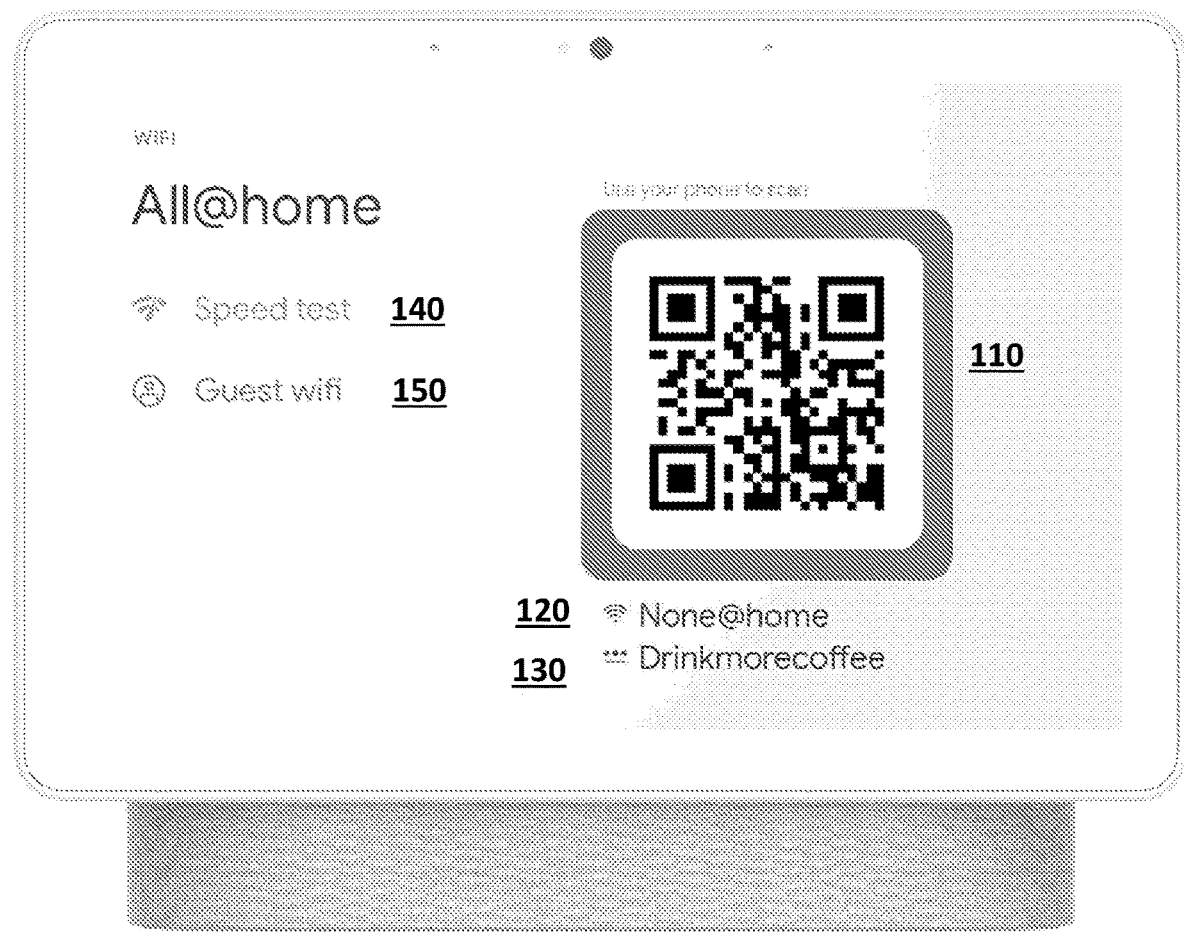
FIG. 1 shows an example of a communal device as disclosed herein.

Embodiments disclosed herein provide devices, methods, systems, and computer-readable media for providing access to a wireless computer network. In an embodiment, a request for network access may be received from a user by a communal device, which may be a computing device as disclosed herein. The communal device may retrieve network connection information for a first network from a network access device, generate a machine-readable code that encodes the network connection information, and providing the machine-readable code via an output of the communal device. The network connection information may include a network identifier that identifies the first network, a network passcode that provides access to the first network, or both. The machine-readable code may be configured to cause a user device to connect automatically to the first network upon being processed by the user device without further input from a user. The machine-readable code may include a visual display, a sound provided at an audible or inaudible to human frequency, or combinations thereof. The network connection information is stored temporarily by the communal device, and/or the communal device may discard the network connection information after the machine-readable code is generated, after it is no longer displayed on a display of the communal device, or at any other suitable time. The communal device may be connected to a second network that is separate from the first network. In some cases, the communal device may be connected only to the second network and not itself directly connected to the first network. The second network may not be accessible from the first network, and/or vice-versa. For example, the second network may be a guest-type network, and may be protected by a passcode or other security measure that is different than the first network. The network access device may be a local network hub, a router, or the like. The communal device may include a user interface to a home system that does not require individual user authentication for access. The communal device may itself be a virtual device or a component of a larger device or system, such as where it is provided via a touchscreen connected to the home system.

In an embodiment, a communal device as disclosed herein may be a computing device that includes an input configured to receive a request for network access from a user or a user device, a communication interface configured to obtain network connection information for a first network from a network access device, a processor configured to generate a machine-readable code that encodes the network connection information for the first network, and an output configured to provide the machine-readable code to the user device, each function having the various options and attributes as previously disclosed.

DETAILED DESCRIPTION

As previously noted, it often is desirable to provide access to a "guest" or similar computer network, such as a wireless network in a residence, business, or the like. Furthermore, it has been found that in many cases it may be desirable to provide such access to any users and/or user devices present in the area, regardless of authentication or authorization of the individual users or devices, in some cases while still preventing use by devices outside a physical area such as the interior of a home or business. It also may be desirable to provide such access with the minimum amount of effort or input provided by the users. For example, it may be desirable to provide access to a local normal or guest wireless network in a home, such that guests of the home may easily and readily connect to the network without having to request network information such as a network ID and/or password from an owner of the network.

Embodiments disclosed herein provide efficient and simple techniques and systems for providing access to a computer network via a communal device. As used herein, a "communal" device refers to a device that provides at least some functions that are available to anyone in the area, such as a smart touch screen in a home that provides at least some functionality without requiring authentication via a username and password, access code such as a PIN, known device authentication, or the like. For example, the device may provide access to some functionality in the home such as light control, local environment information, or media controls. In some cases, other functionality, such as access to stored documents, security system interfaces such as alarm settings, or the like may not be available via the communal device without further authentication by an authorized user. Notably, some degree of security is still available since access to the communal device may be required to access the wireless network as disclosed in further detail below.

Embodiments disclosed herein may provide access to a computer network without requiring users in the area to log in to the network or obtain network ID and/or passcode information, in contrast to conventional wireless networks that require guests to obtain a network ID, passcode, and/or other identifying information to access the guest network. Embodiments disclosed herein also may provide such access without requiring local storage of the network information and without requiring access to other network resources, such as a protected network, user credentials, or the like. Unlike other wireless network sharing solutions such as phone-to-phone type sharing, embodiments disclosed herein do not require another user device to have and provide access to the network, nor is it required for the communal device to have access to the network to which it will provide access information for other devices.

FIG. 1 shows an example of a communal device as disclosed herein. The device may include and be implemented on any suitable hardware device, such as a smart screen, a conventional home computer, a tablet or other portable or fixed computing device, or the like. The communal device may include one or more outputs such as a screen, speaker, or the like, with which the communal device may provide information to users in the area. For example, where the communal device includes a screen, information may be provided to any user within visual range of the device. As another example, where the communal device includes a speaker and microphone, commands may be received from users within speaking range of the device via the microphone, and information may be provided via the speaker to any user or device within audible range of the speaker. In some cases, information provided by the communal device may include information that may be processable by a computer but not understandable directly by a human user, such as where a machine-readable code is provided on a screen or an audible signal is provided via a speaker that encodes information that may be processed by an electronic device, though a human may not hear or understand the information. As a specific example, a communal device may provide information via a speaker in the ultrasonic range, which may be received and processed by other computerized devices having microphones such as phones, tablets, and the like. Such a signal may be referred to a "machine-readable code" or "machine-processable audio signal" or the like.

The communal device may be connected to or otherwise incorporated with a home system as disclosed herein. For example, the communal device may provide information about the home and/or provide functionality available within the home system. The example communal device shown in FIG. 1 includes two illustrative functions—a speed test 140 and a guest wifi interface 150. Other functions may be available via the communal device. As previously disclosed, a "communal device" in a home or comparable system may be distinguished from other devices and interfaces such as a security access panel, a personal mobile device such as a phone, or other devices, because the communal device may be available to any person in the area without authentication or authorization of the person. In contrast, a non-communal device may be available only to authorized users, such as where an interface to security functions of the home is only available to users that have authenticated via a login screen, a mobile phone link, or the like.

The communal device in FIG. 1 shows a state in which a user has selected the "Guest wifi" function 150. The function 150 may be selected from a screen as shown in FIG. 1, which displays multiple communal device functions. The screen shown may be a secondary screen, for example, where the communal device initially shows a "welcome" screen or similar interface that is subsequently replaced by the function screen shown based on initial interaction such as a touch or voice command by a nearby user. Embodiments may allow for different forms of interaction with the communal device, including touch, voice, or a combination thereof. For example, to activate the Guest wifi function 150, a user may touch the text and/or the associated icon. Alternatively or in addition, the user may speak a command such as "Show me the guest wifi" within operable range of the communal device or after performing an initial activation such as tapping the screen to "wake up" the device or activating the device via a voice command. As previously disclosed, a user or device may be considered to be within range of the communal device when the user or device is sufficiently close to receive visual and/or auditory information in a form understandable by the user or that can be processed by the device.

In response to a user activating the guest wifi feature 150, the communal device may present various information about a guest wireless network available in the home or business location. The information may include the wireless network Service Set Identifier (SSID) name 120, and an access code such as Pre-Shared Key (PSK) that is needed to access the identified network. The communal device also may provide a machine-readable code 110, such as a bar code, QR code, or the like, which provides the SSID, PSK, and/or any other information that a computing device may use to access the provided wireless network. Such a code may allow for user devices such as phones, tablets, portable computers, or the like to connect to and access the wireless network identified at 120, 130 without further user interaction or input. For example, a user may scan the machine-readable code 110 with the camera of his phone, which will then use the information to connect to the guest wireless network. After the user scans the machine-readable code 110 or otherwise provides the wireless network information 120, 130 to her device, the user device may access and use the identified wireless network.

Figure 2:
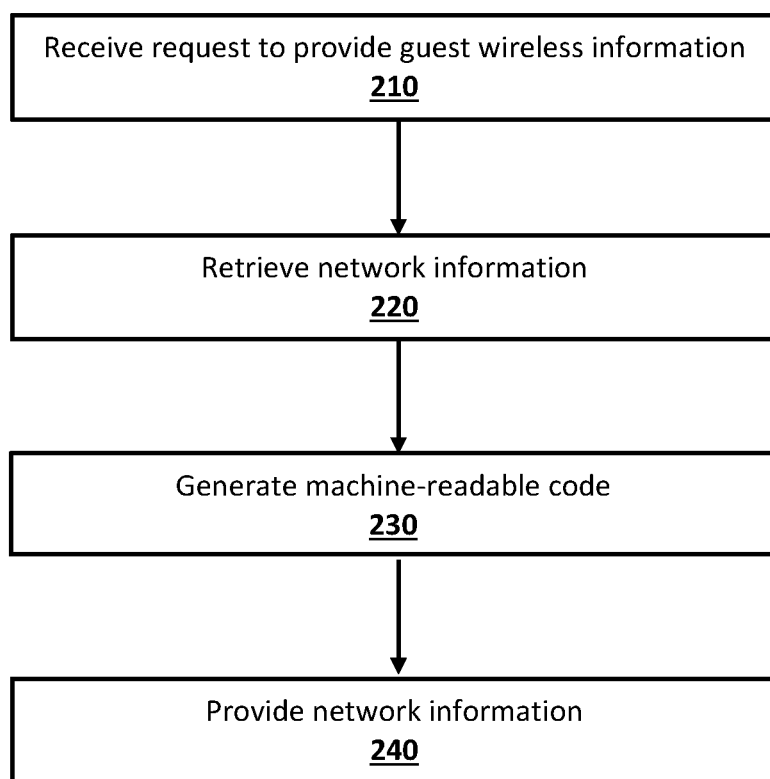
FIG. 2 shows an example process for obtaining and providing network information according to an embodiment of the present subject matter.

FIG. 2 shows an example process for obtaining and providing network information according to an embodiment of the present subject matter. At 210, a communal device as previously disclosed may receive a request to provide network information, such as for a guest wifi or other computer network. The communal device may retrieve the network information from a source, such as a router or other device with which the communal device is in communication, at 220. For example, a home router provided by an Internet Service Provider, home provider, or other source may provide one or more wireless networks within a home or other premises. The router may store network information such as SSIDs, PSKs, and other information for one or more networks provided and/or managed by the router. This information may be provided to the communal device in any suitable form, and may be encrypted or otherwise protected. Notably, the communal device need not be connected to the router via the same network for which network information is obtained. For example, the communal device may be connected to the router via a protected or private network for which connection information will not be provided via the communal device, and may obtain network information for a separate guest or public network that is also managed or provided by the router.

At 230, the communal device may generate a machine-readable code, such as a QR code or similar as previously disclosed, which encodes the network information. The machine-readable code may be sufficient to allow user devices to connect to the network for which the information was obtained without further input or action by a user, as previously disclosed.

At 240, the communal device may present the network information, such as via a display screen, a speaker, or other interface. Some embodiments may provide automated mechanisms for nearby user devices to obtain the network information directly, such as via an app configured to obtain information from a predefined-format wireless message sent by the communal device. The communal device may not store the network information and/or the machine-readable code after it has been provided via a display or other interface. For example, the network information may be maintained in volatile memory only long enough to generate the machine-readable code, and the machine-readable code may be discarded once it is no longer displayed by the communal device.

Figure 3:
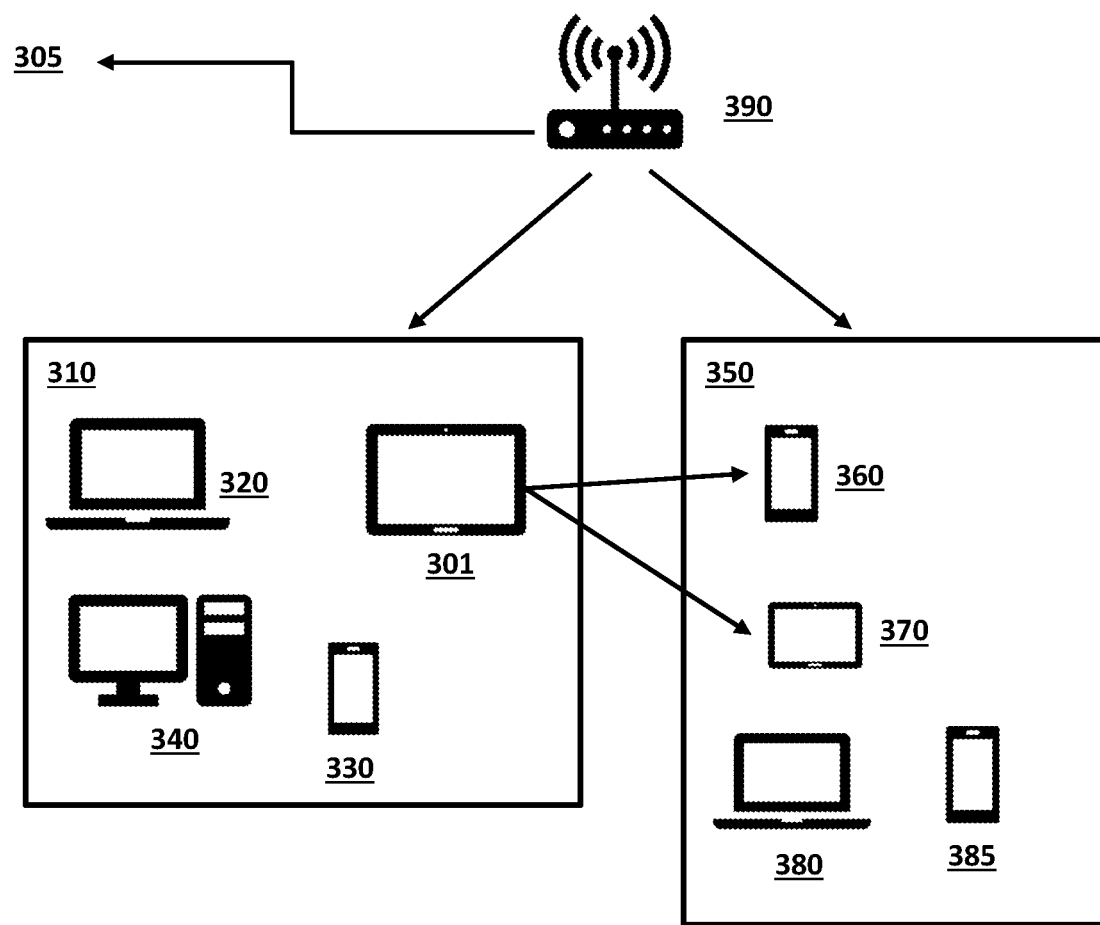
FIG. 3 shows an example system and network arrangement according to embodiments disclosed herein.

FIG. 3 shows an example system and network arrangement according to embodiments disclosed herein. A router 390 may provide one or more computer networks 310, 350, such as wifi networks. The router also may provide access to the Internet or other local or remote network 305, such as by providing access to the network 305 to any devices connected to the local networks 310, 350 provided by the router 390. The router 390 and networks 310, 350 may be part of a home or similar system as disclosed herein. The networks may be protected by conventional wireless protection techniques that require a PSK or other passcode to access, as previously disclosed. In this example, the router 390 provides a private network 310 that requires a secret code to access. Devices such as laptops 320, desktop computers 340, mobile devices 330, and the like may be configured to access the network 310 using conventional techniques, such as where a user selects a network by SSID or other identifier and provides the appropriate PSK or other passcode, which the device uses to access the network 310. A communal device 301 may be similarly configured. The network 310 also may be a wired network that provides direct access to any device connected to the network or via any conventional security technique.

The wireless network 350 may be a guest or public network that has limited access to other resources on the network or in the home or other environment. For example, devices connected to the router 390 through the wireless network 350 may be prevented from communicating with some or all of the devices on the private network 310, prevented from full access to the Internet 305 or other network, or otherwise prevented from accessing all resources that may be available in the environment or to devices on the private network 310. Some devices 380, 385 may be configured to access the wireless network 350 through any conventional means, such as by a user providing the appropriate network information to the device. Devices 360, 370 may access the wireless network 350 by obtaining the network information from the communal device 301 as previously disclosed.

The communal device 301 may be connected to the router 390 via the network 310 as previously disclosed. Alternatively or in addition, the communal device 301 also may be connected to the router 390 via the wireless network 350 or any other communication network. Alternatively or in addition, the communal device may be connected to the router 390 via a physical connection, such as a direct network connection or via one or more switches, routers, or the like.

Figure 4:
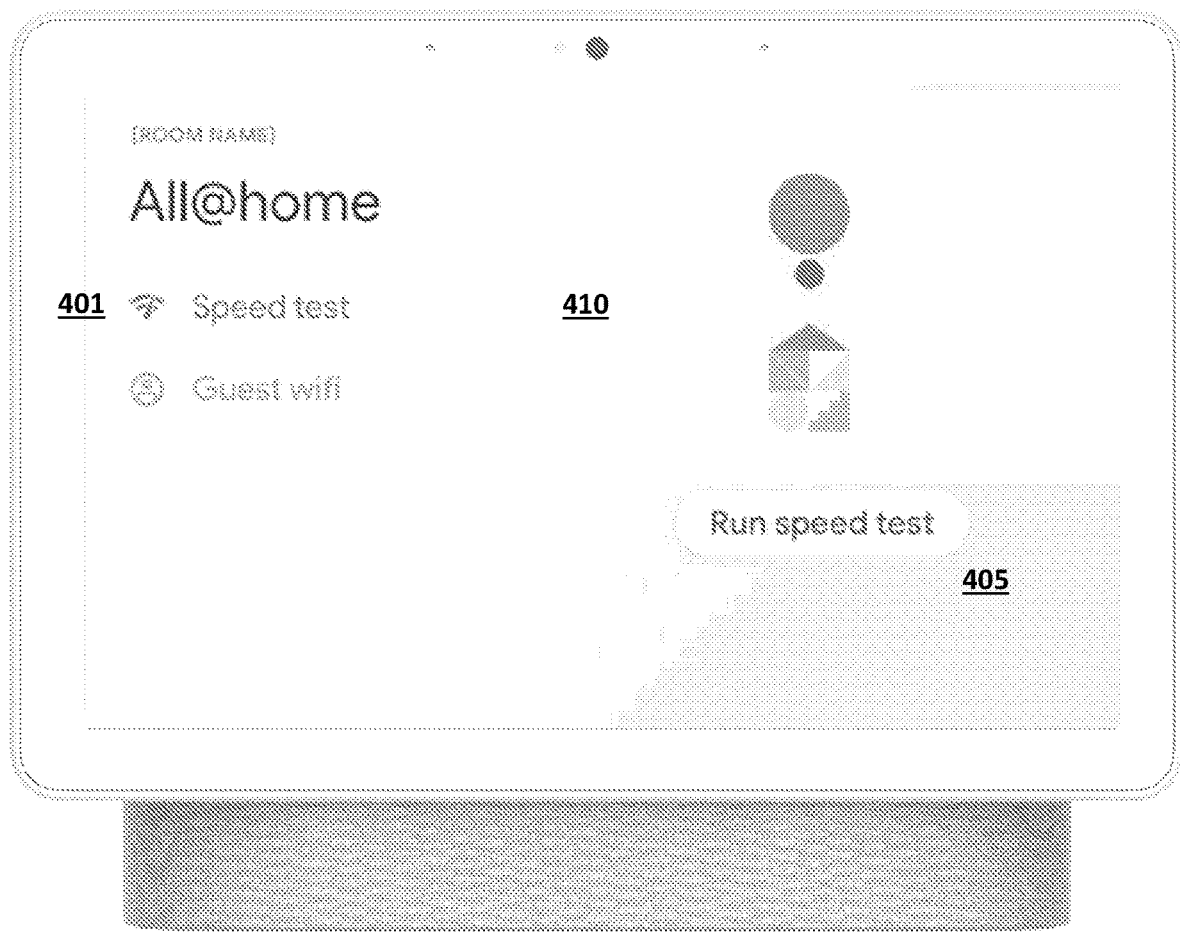
FIG. 4 shows an example of an interface for running a speed test on a communal device as disclosed herein.
Figure 5:
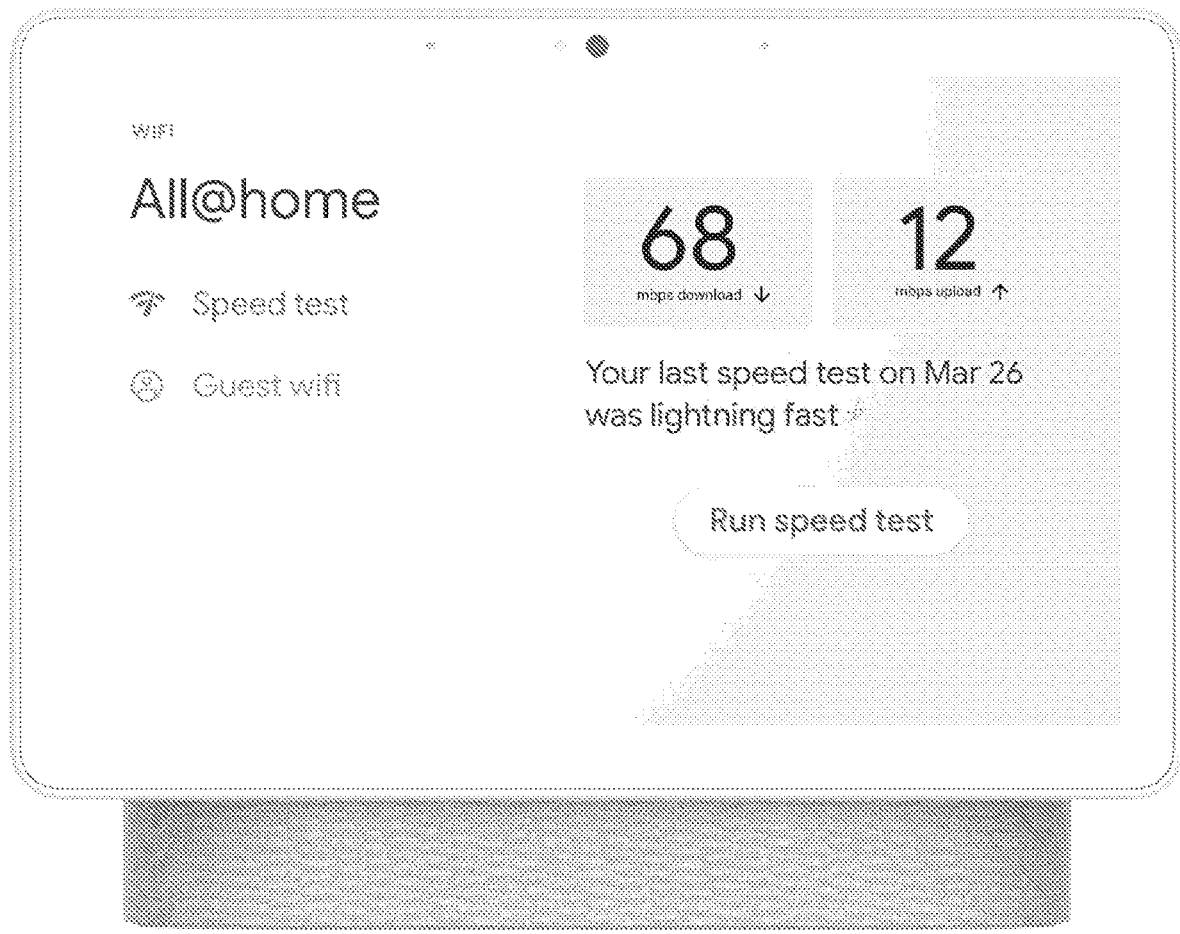
FIG. 5 shows a communal device with an example interface for providing test results as disclosed herein.

In some embodiments, the communal device may provide other functions. For example, FIG. 4 shows an example of an interface for running a speed test on a communal device as previously disclosed. Any user in the area of the interface may activate the speed test, such as by selecting the "speed test" function 401 and touching the "run speed test" button 415 or via a voice command as previously disclosed. The interface may provide an "in progress" visualization 410 to indicate that the speed test is running. For example, a colored ball may move from the top of the interface to the bottom and/or the house icon may "fill" with color as the test runs, or the interface may otherwise indicate that the test is being run and has not timed out or failed to complete. Once the test is complete, the communal device may provide the results, for example as shown in FIG. 5. Other functions may be provided via the communal device, such as where an authorized user determines that the other functions are considered safe for use by any user that is in the home or other premises.

Although the subject matter disclosed herein has used examples of a "guest" wireless network and related functions, embodiments may be used to provide access to any other resource, including private networks, virtual networks, remote or local computing resources, or the like, without departing from the scope of subject matter disclosed herein. For example, the same devices, systems, and techniques may be used to provide access to other features of a home that typically would require user authentication or authorization, which access may be provided in a limited ("guest") capacity or in the same capacity as would be provided to an authenticated user. As a specific example, users in the area of the communal device may be provided with controls to access and view media content through an account of an authorized user of the home, such as a streaming account for playing music, viewing movies or television shows, or the like. The communal device may limit such access to, for example, a "guest" account as with the wifi example, a family-friendly account that restricts the type of content shown, a time-limited account that only provides access during the time of an expected event on the premises, or the like.

Systems, devices, and methods as disclosed herein may operate within a home and/or an associated computer communication network, such as a conventional wireless network, and/or a sensor-specific network through which sensors may communicate with one another and/or with dedicated other devices. In some configurations one or more devices may provide information to one or more other sensors, to a central controller, or to any other device capable of communicating on a network with the device. A central controller may be general- or special-purpose. For example, one type of central controller is a home automation network, that collects and analyzes data from one or more sensors within the home. Another example of a central controller is a special-purpose controller that is dedicated to a subset of functions, such as a security controller that collects and analyzes sensor data primarily or exclusively as it relates to various security considerations for a location. A central controller may be located locally with respect to the devices with which it communicates and from which it obtains sensor data, such as in the case where it is positioned within a home that includes a home automation and/or sensor network. Alternatively or in addition, the central controller may be physically remote, such as where the central controller is implemented as a cloud-based system.

A home environment as disclosed herein may include a sensor network including one or more devices such as multi-sensing, network-connected devices, which can integrate seamlessly with each other and/or with a central server or a cloud-computing system to provide home-security, convenience, and other features. The home environment may include one or more other devices that may operate in conjunction with one another, such as multi-sensing, network-connected thermostats, hazard detection units, network-connected entryway interface devices (e.g., doorbells), security cameras, or other similar devices, as well as conventional computing devices including general-purpose computers, phones, tablets, and the like.

One or more users can control a the home environment using a network-connected computer or portable electronic device such as a phone, tablet, or similar device. In some examples, some or all of the users (e.g., individuals who live in the home) can register their mobile device with the home environment (e.g., with a central controller). Such registration may authenticate the user and/or the electronic device as being associated with the home environment, and may provide permission to the user to use the electronic device to control the network-connected smart devices and the security system of the home environment. For example, an authenticated user device may access a private communication network as disclosed herein. A user may use their registered electronic device to remotely control the network-connected smart devices and security system of the home environment, such as when the occupant is at work or on vacation. The user may also use their registered electronic device to control the network-connected smart devices when the user is located inside the home environment.

Alternatively, or in addition to registering electronic devices, the home environment may make inferences about which individuals live in the home and are therefore users and which electronic devices are associated with those individuals. As such, the home environment may "learn" who is a user (e.g., an authorized user) and permit the electronic devices associated with those individuals to control the network-connected smart devices of the home environment, in some embodiments including sensors used by or within the home environment. Various types of notices and other information may be provided to users via messages sent to one or more user electronic devices. For example, the messages can be sent via email, short message service (SMS), multimedia messaging service (MMS), unstructured supplementary service data (USSD), as well as any other type of messaging services and/or communication protocols.

Notably, embodiments disclosed herein may operate without requiring, requesting or otherwise accessing personal information about users, devices, networks, or the like. For example, as previously disclosed, embodiments disclosed herein may discard network access information such as network identifiers and passcodes after generating a machine-readable code, and may discard the machine-readable code once it is no longer shown to users. Similarly, as previously disclosed, embodiments disclosed herein may provide systems and techniques for users to access wireless networks or other resources without providing any information to the home network or other devices and networks in the area.

Embodiments of the presently disclosed subject matter may be implemented in and used with a variety of computing devices. For example, a computing device suitable for use with embodiments disclosed herein may be, for example, a desktop or laptop computer, or a mobile computing device such as a phone, tablet, or the like. The device may include a communication bus that interconnects major components of the computer, such as a central processor, a memory such as Random Access Memory (RAM), Read Only Memory (ROM), flash RAM, or the like, a user display such as a display screen, a user input interface, which may include one or more controllers and associated user input devices such as a keyboard, mouse, touch screen, and the like, a fixed storage such as a hard drive, flash storage, and the like, a removable media component operative to control and receive an optical disk, flash drive, and the like, and a network interface operable to communicate with one or more remote devices via a suitable network connection. Applications resident with the computer are generally stored on and accessed via a computer readable storage medium.

Various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as hard drives, USB (universal serial bus) drives, or any other machine readable storage medium, such that when the computer program code is loaded into and executed by a computer, the computer becomes an apparatus for practicing embodiments of the disclosed subject matter. When implemented on a general-purpose microprocessor, the computer program code may configure the microprocessor to become a special-purpose device, such as by creation of specific logic circuits as specified by the instructions.

Embodiments may be implemented using hardware that may include a processor, such as a general-purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

What is claimed is:

1. A method comprising:
receiving, at a communal device, a voice command from a user that is nearby the communal device, wherein the voice command includes a request for network access to a guest network that is managed by a network access device, wherein the communal device is connected to a private network that is managed by the network access device and wherein the guest network and the private network are separate networks supported by the network access device;

retrieving, by the communal device, network connection information representative of a network identifier that identifies the guest network and a passcode that provides access to the guest network from the network access device, wherein the communal device is not connected to the guest network, wherein the network connection information is stored temporarily by the communal device;

determining, by the communal device, a machine-readable code that encodes the network connection information for the guest network; and in response to the received voice command from the user that is nearby the communal device, presenting the machine-readable code on a display of the communal device, wherein the communal device discards the machine-readable code after it is no longer shown on the display of the communal device.

2. The method of claim 1, wherein the machine-readable code comprises a sound.

3. The method of claim 2, wherein the sound is emitted at one or more frequencies that are not within the range of human hearing.

4. The method of claim 1, wherein the communal device discards the network connection information after the machine-readable code is generated.

5. The method of claim 1, wherein the network access device is a local network hub.

6. The method of claim 1, wherein the communal device comprises a user interface to a home system that does not require individual user authentication for access.

7. The method of claim 6, wherein the communal device is provided via a touchscreen connected to the home system.

8. The method of claim 1, wherein private network is not accessible from the guest network.

9. The method of claim 8, wherein the guest network comprises a wireless network that is protected by a passcode different than a passcode that provides access to the private network.

10. A communal device comprising:
an input configured to receive a voice command from a user that is nearby the communal device, wherein the voice command includes a request for network access to a guest network that is managed by a network access device, wherein the communal device is connected to a private network that is managed by the network access device and wherein the guest network and the private network are separate networks supported by the network access device;

a communication interface configured to obtain network connection information representative of a network identifier that identifies the guest network and a passcode that provides access to the guest network from the network access device, wherein the communal device is not connected to the guest network, wherein the network connection information is stored temporarily by the communal device;

a processor configured to determine a machine-readable code that encodes the network connection information for the guest network; and a display configured to present the machine-readable code to a computing device in response to the received voice command from the user that is nearby the communal device, wherein the communal device discards the machine-readable code after it is no longer shown on the display of the communal device.

11. A non-transitory computer-readable medium storing a plurality of instructions which, when executed by a computer processor, cause the computer processor to perform a method comprising:

receiving a voice command from a user that is nearby a communal device, wherein the voice command includes a request for network access to a guest network that is managed by a network access device, wherein the communal device is connected to a private network that is managed by the network access device and wherein the guest network and the private network are separate networks supported by the network access device;

retrieving network connection information representative of a network identifier that identifies the guest network and a passcode that provides access to the guest network from the network access device, wherein the communal device is not connected to the guest network, wherein the network connection information is stored temporarily by the communal device;

determining a machine-readable code that encodes the network connection information for the guest network; and in response to the received voice command from the user that is nearby the communal device, presenting the machine-readable code on a display of the communal device, wherein the communal device discards the machine-readable code after it is no longer shown on the display of the communal device.

* * * * *